United States Patent [19]

Farr

[11] 3,774,733
[45] Nov. 27, 1973

[54] BRAKE ADJUSTERS
[75] Inventor: Glyn Phillip Reginald Farr, Kenilworth, England
[73] Assignee: Girling Limited, Tyseley, Birmingham, England
[22] Filed: Aug. 7, 1972
[21] Appl. No.: 278,355

[52] U.S. Cl. ........ 188/196 D, 188/71.9, 188/79.5 P
[51] Int. Cl. ............................................ F16d 65/56
[58] Field of Search ...................... 188/71.9, 79.5 P, 188/79.5 GT, 196 D

[56] References Cited
UNITED STATES PATENTS
3,550,732  12/1970  Beller............................ 188/196 D
FOREIGN PATENTS OR APPLICATIONS
1,910,573  9/1970  Germany........................... 188/71.9

*Primary Examiner*—Duane A. Reger
*Attorney*—Samuel Scrivener et al.

[57] ABSTRACT

An encapsulated slack adjuster mechanism for a vehicle brake comprises an encapsulating container in which are disposed a nut having a non-reversible internal thread, an annulus encircling the nut, a reversible screwthread connection and cooperating friction surfaces. The reversible screw thread connection is between the annulus and the container or between the annulus and the nut whilst the friction surfaces are between the annulus and the nut or between the annulus and the container, respectively. A first spring acts on the annulus to urge the friction surfaces towards one another. A second spring acts on the second member and urges the latter into engagement by an abutment surface with a complementary non-rotatable abutment surface which may be on the container when the brake is not applied to avoid the nut turning when this is not desired. The first spring is in the container but the second spring may be within the container or may be external thereto. In the latter case the second spring can be a brake return spring.

23 Claims, 6 Drawing Figures

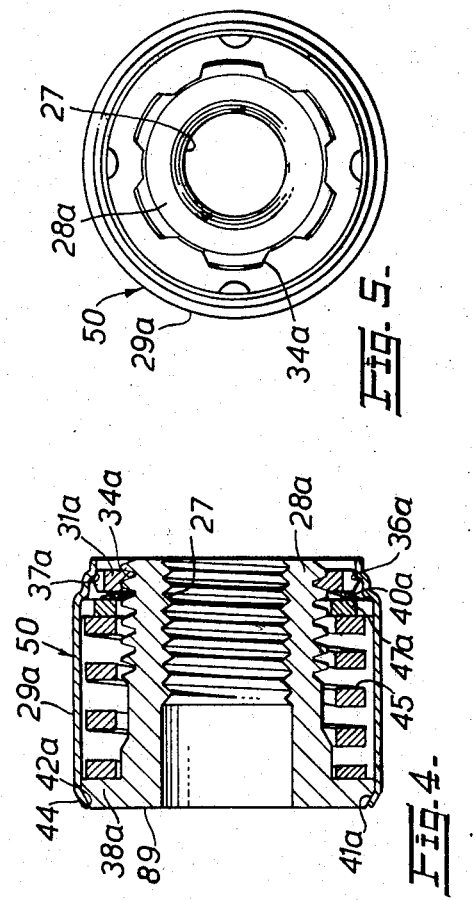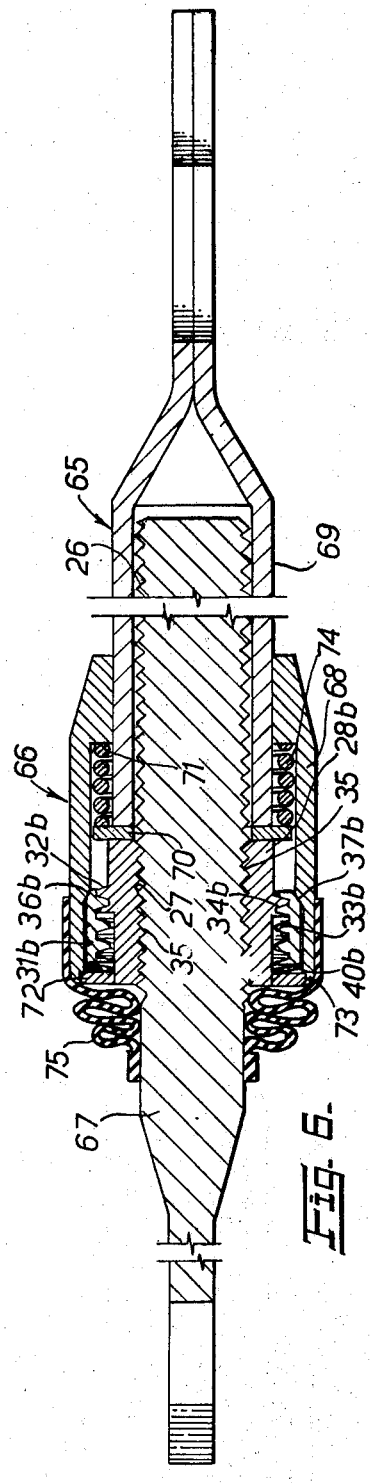

BRAKE ADJUSTERS

The present invention relates to brake slack adjusters of the kind described in British Pat. No. 1,179,235 and the corresponding U.S. Pat. No. 3,442,357 wherein an interengagement through a helically inclined surface is used to convert excessive axial displacement between two members into a rotary motion for screwing a screw-thread connection to effect automatic adjustment. The invention relates more particularly to a slack adjuster of this kind in which the interengagement through a helically inclined surface comprises a reversible screw-thread connection.

In United States Patent application Ser. No. 64,518 there is described a slack adjuster for a brake system comprising a first non-rotatable member, a second rotatable member and a third non-rotatable member having a common thrust axis, a non-reversible screw-thread connection between said first and second members, said second member being axially displaceable and rotatable relative to said third member and said second member having an abutment surface mating with a complementary non-rotatable abutment surface; a fourth member coaxial with said thrust axis; a reversible screw-thread connection between said fourth member and one of said second and third members; cooperating friction surfaces between said fourth member and the other of said second and third members; and resilient means biassing said fourth member in a direction to urge said friction surfaces towards one another.

A reversible screw-thread connection between two members is a connection such that axial displacement of one member causes rotation of the other member and *vice versa* whereas a non-reversible screw-thread connection between two members is one in which an axial force applied to one member cannot normally cause relative rotation between the members. Whether a screw-thread connection is reversible or not depends upon the pitch and flank angles of the thread and the coefficient of friction between the members.

Thus upon the presence of excessive brake slack, said resilient means biasses said friction faces to prevent said fourth member from rotating and the axial travel between said first and third members upon actuation of the brake system causes said reversible screw-thread connection to turn said second member to screw said non-reversible screw-thread connection in a direction to reduce the brake slack.

In the embodiments illustrated in the above-mentioned patent application, the second member is in the form of a sleeve which surrounds at least parts of the first and fourth members and the fourth member is in the form of a screw member axially aligned with the first member and having a domed head against which the resilient means acts with low frictional torque.

In accordance with one aspect of the invention, a slack adjuster for a brake system comprises a first non-rotatable member, a second rotatable or nut member and a third non-rotatable member having a common axis thrust axis the first and second members having mating external and internal threads respectively forming non-reversible screw-thread connection between said first and nut members, said nut member being axially displaceable and rotatable relative to said third member; a fourth or annular member coaxial with said thrust axis and encircling said nut member; a reversible screw-thread connection between said annular member and one of said nut and third members; cooperating friction surfaces between said annular member and the other of said nut and third members; and resilient means axially biassing said annular member in a direction to urge said friction surfaces towards one another.

The nut member will generally have an abutment surface mating with a complementary non-rotatable abutment surface and the slack adjuster may further comprise second resilient means biassing said nut member in a direction to urge said abutment surfaces into engagement with one another when the brake system is released in order to increase the frictional torque resisting rotation of said nut member.

Advantageously the third member comprises an encapsulating container within which are disposed the second member, the fourth member and the resilient means acting on the fourth member.

According to another aspect of the present invention, a slack adjuster mechanism for a vehicle brake system comprises a nut member having an internal screw thread adapted to mate with an external screw thread on a strut member to form a non-reversible screw thread connection, an encapsulating container member surrounding said nut member, said nut and container members having cooperating axial abutment surfaces, an annular member disposed within said container member and encircling said nut member, said annular member and one of said nut and container members having a reversible screw thread connection therebetween, said annular member and the other of said nut and container members having cooperating friction surfaces therebetween, and resilient means disposed within said container member and axially biasing said annular member in a direction to urge said friction surfaces towards one another.

In accordance with some embodiments of the invention, wherein the reversible screw thread connection is between the annular member and the third or container member, the reversible screw thread connection comprises an external thread on the outer periphery of the annular member mating with an internal thread inside the third or container member and the friction surfaces comprise an internal annular surface inside the annular member cooperating with an external friction surface around the nut member.

In other embodiments of the invention, wherein the reversible screw thread connection is disposed between the annular member and the nut member, the reversible screw thread connection comprises an internal thread inside the annular member mating with an external thread around the nut member and the cooperating friction surfaces comprise an external annular surface around the annular member cooperating with an internal annular surface inside the third or container member.

The resilient means preferably comprises a spring washer bearing against the annular member.

The adjuster mechanism may be provided with an additional spring acting axially on the nut member to bias the abutment surfaces against one another.

Said additional spring may be disposed in said container member to act between the nut and container members or it may be external thereto, e.g. as a brake return spring.

The invention is further described, by way of example, with reference to the accompanying drawings, in which:

FIG. 4 is a sectional view, similar to FIG. 2, but showing a second embodiment of slack adjuster mechanism in accordance with the invention;

FIG. 5 is an end view of the slack adjuster mechanism of FIG. 4; and

FIG. 6 is a sectional detail view of part of a drum brake which is fitted with a slack adjuster in accordance with a further embodiment of the invention.

Figure 1:
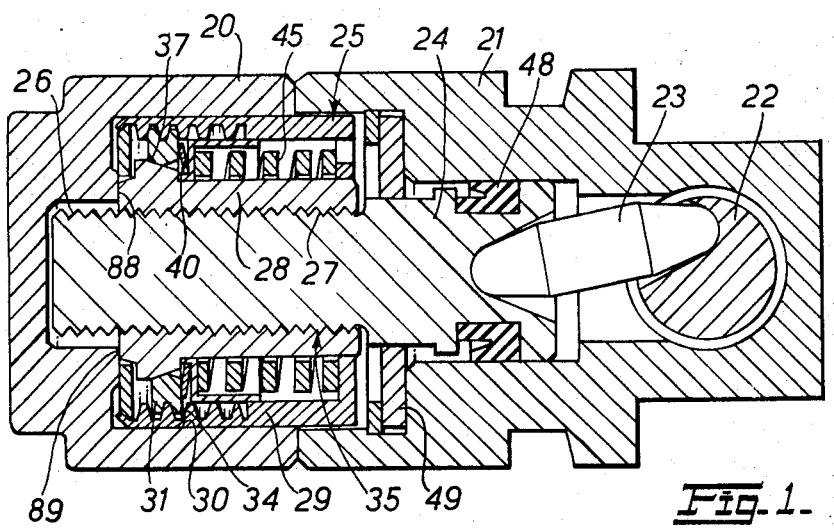
FIG. 1 is a sectional elevation of an opposed piston hydraulic actuator fitted with a slack adjuster in accordance with one embodiment of the invention.

FIG. 1 of the drawings shows opposed pistons 20 and 21 of a hydraulic actuator for a disc brake such as a disc brake of the kind described and illustrated in British Pat. Nos. 1,075,371 and 1,147,639. The pistons 20 and 21 are slidable in a through bore in a fixed body member. A plate-like yoke straddles the disc and is slidably supported in longitudinal grooves extending along opposite sides of the fixed body member. The piston 20 acts upon a directly operated pad assembly and the piston 21 acts upon the yoke which in turn acts upon an indirectly operated pad assembly opposed to the directly operated pad assembly. The brake is applied hydraulically by supplying the brake fluid to the space between the opposed pistons 20 and 21.

An auxiliary mechanical actuator (hand brake) comprises a cam 22 journalled in the piston 21 and acting through a dolly 23 on a strut 24. The strut 24 acts in turn through an encapsulated slack adjuster mechanism 25 in the piston 20. The strut 24 constitutes a first member of the slack adjuster and has an external screw thread 26 mating with an internal screw thread 27 in a nut 28 forming a second member of the slack adjuster.

The slack adjuster includes a third member in the form of a cylindrical encapsulating container 29 which is press fitted in a blind bore 30 in the piston 20. The piston 20 can therefore be considered as also being a part of the third member of the slack adjuster.

Figure 2:
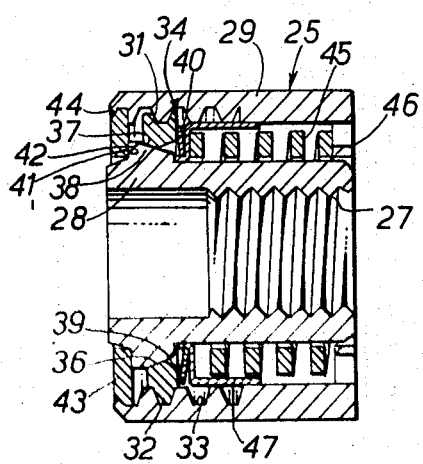
FIG. 2 is a sectional view of the slack adjuster mechanism of FIG. 1.
Figure 3:
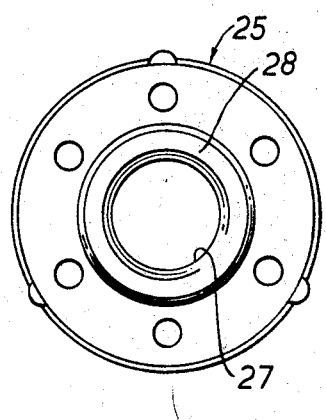
FIG. 3 is an end view of the slack adjuster mechanism of FIG. 2.

The slack adjuster mechanism 25 is shown by itself in FIGS. 2 and 3 of the drawings. In addition to the nut 28 and the container 29 it also includes a fourth member in the form of an annulus 31. The annulus 31 is disposed within the container 29 and surrounds the nut 28. The annulus 31 has multi-start external screw thread 32 mating with a multi-start internal screw thread 33 inside the casing 29 to form a reversible screw thread connection 34. The reversible screw thread connection 34 is of the opposite hand to the non-reversible screw thread connection 35 formed by the threads 26 and 27 i.e. assuming that the screw thread connection 35 is a right hand thread then the reversible screw thread connection 34 will be a left hand thread.

The annulus 31 has an internal conical friction surface 36 which cooperates with an external conical friction surface 37 formed on a flange 38 at one end of the nut 28. To simplify assembly during manufacture, the annulus 31 is provided with a second internal conical surface 39 directed oppositely to the surface 36 so that the annulus 31 can be inserted in the container 29 either way round. Resilient means in the form of a bowed washer spring 40 acts on the annulus 31 in a direction to axially bias the conical surfaces 36, 37 into frictional engagement with one another.

An abutment surface 41 formed on one side of the flange 38 on the nut 28 cooperates with a complementary abutment surface 42 formed on the inside of a ring 43 fitted inside the cylindrical container 29. The ring 43 is retained in position by a peened over edge 44 on the container 29 and thereby effectively forms part of the third member of the adjuster. An additional spring 45 acts on the nut 28 to axially bias the nut in a direction to bring the abutment surfaces 41 and 42 into engagement with one another.

The spring 45 acts between an internal flange 46 inside the container 29 at the end remote from the ring 43 and a spring abutment cup 47. The abutment cup 47 engages a frictional abutment surface formed by the side of the flange 38 remote from the abutment surface 41. It serves to keep the spring 45 away from the internal screw thread 33 inside the container 29 and also defines an external recess to receive and locate the bowed washer sring 40. Thus the spring 40 acts between the annulus 31 and the spring abutment 47 but the spring 45 is stronger than the spring 40 so that the spring abutment remains in engagement with the flange 38. The strut 24 is sealed to the piston 21 by a sealing ring 48 and is prevented from turning by a plate 49 which is attached to the piston 21 by a spring ring and which engages in a flat or groove in the strut.

It will be seen from FIGS. 2 and 3 that the encapsulated adjuster mechanism 25 forms a complete replaceable sub-assembly but does not constitute the whole of the slack adjuster inasmuch as the strut 24 is required to complete the adjuster. Also the same adjuster mechanism 25 is suitable for pistons of different external diameters, it only being necessary to provide the pistons with a blind bore 30 of appropriate diameter to receive the adjuster mechanism 25 with the desired press fit.

The normal brake travel between the pistons 20 and 21 is accommodated by axial clearances at the screw-thread connections 34 and 35. The axial clearance at the non-reversible screw thread connection 35 is that normally present due to manufacturing tolerances. Thus the reversible screw-thread connection 34 is provided with substantial axial clearance to accommodate a preponderant proportion of the normal brake travel.

It will now be supposed that some pad wear has taken place so that the next time the brake is applied hydraulically the travel between the pistons 20 and 21 exceeds a desired travel or slack as determined by the thread clearances.

The hydraulic pressure acting between the pistons 20 and 21 also acts on the strut 24 to urge the strut to the right together with the piston 21. As the pistons 20 and 21 move apart the strut 24 pulls the nut 28 to the right against the force of the spring 45. When the thread clearances have been taken up, the nut 28, pressing through the conical friction surfaces 36 and 37 also presses the annulus 31 to the right relative to the container 29. Because of this relative axial movement, the reversible screw thread connection 34 causes the annulus 31 to rotate. Because of the spring 40 acting on the annulus 31 and because of the axial force applied to the annulus 31 by the nut 28 at the conical friction surfaces 36 and 37 the frictional torque developed at the friction surfaces 36 and 37 is greater than the frictional torque developed at the side of the flange 38 on the nut 28 by the force of the spring 45. The annulus 31 thereby turns the nut 28 to effect adjustment at the non-reversible screw thread connection 35 in a direction to reduce the brake slack. When the hydraulic pressure is released, the spring 45 acting as a strut return spring urges the nut 28 to the left until the abutment surfaces 41 and 42 again come into engagement with one another. The leftward movement of the nut 28 relative to the container 25 tends to part the conical friction surfaces 36 and 37 so that the frictional torque developed at the conical friction surfaces is now less than the frictional torque developed on the nut 28 by the spring 45. The spring 40, which is lighter than the spring 45, urges the annulus 31 to the left so that the reversible screw thread connection causes the annulus 31 to turn in the opposite direction but the spring 45 now prevents the nut 28 from turning so that slipping takes place at the friction surfaces 36 and 37.

The dimensions of the various parts may be such that, when the mechanism 25 is fitted in the piston 20, the bore end surface 88 in the piston 20 engages the end surface 89 of the nut 28 to keep the surfaces 41 and 42 slightly parted. In this case, since the piston 20 is effectively part of the third member of the slack adjuster, the surfaces 89 and 88 take over the role of abutment surfaces between the second and third members.

FIGS. 4 and 5 of the drawings show a different embodiment of encapsulated brake slack adjusting mechanism 50.

In FIGS. 4 and 5 the multi-start reversible screw thread connection 34a is between the annulus 31a and the nut 28a and comprises an internal screw thread inside the annulus 31a and an external screw thread on the nut 28a. The annulus 31a and the nut 28a are made of steel. An external conical friction surface 36a on the annulus 31a cooperates with an internal annular friction surface 37a defined by a step inside the encapsulating container 29a, which in this embodiment is made of pressed steel. The spring 45 acts between an external flange 38a on the nut 28a and a washer 47a which bears against a frictional abutment surface formed by a second step inside the encapsulating container 29a. The spring 40a acting on the annulus 31a is disposed between this annulus and the washer 47a. The spring 45 acts in a direction to urge the abutment surfaces 41 and 42 on the flange 38a and inside the peened-over edge of the container 29a respectively into engagement with one another and the spring 40a urges the frictional surfaces 36a and 37a into frictional engagement with one another.

The adjuster mechanism 50 of FIGS. 4 and 5 replaces the mechanism 25 in FIG. 1. The encapsulating container 29a is push fitted inside the blind bore 30 in the piston 20 and the strut 24 acting as the strut or first member of the adjuster is screwed into the internal screw thread 27 in the nut 28a.

The operation of the adjuster mechanism of FIGS. 4 and 5 is substantially equivalent to that of FIGS. 1 to 3. When the encapsulating container 29a moves to the left relative to the strut 24 (FIG. 1) during brake application and when there is excessive brake slack, the clearance at the scew thread connections 35 and 34a is taken up and the annulus 31a is moved to the left relative to the nut 28a. Because this movement produces an axial force applied to the annulus 31a through the friction surfaces 36a, 37a the frictional torque developed at the friction surfaces is greater than the frictional torque developed on the nut 28a by the spring 45, the annulus 31a is prevented from turning so that the reversible screw thread connection 34a causes the nut 28a to be turned slightly to compensate for the excess travel. When the brake is released the spring 45 returns the nut 28a until the abutment surfaces 41a and 42a again engage one another but this time the frictional torque developed at the friction surfaces 36a, 37a is less than that developed on the nut 28a by the spring 45 so that the annulus 31a turns back but the nut 28a does not.

As in the first embodiment the normal brake travel is accommodated preponderantly by axial clearance at the reversible screw-thread connection 34a, the axial clearance at the non-reversible screw-thread connection 35 having no more than that dictated by usual manufacturing tolerances.

Also as in the first embodiment the dimensions may be such that the end surface 89 on the nut 28a engages the bore end surface 88 (FIG. 1) to slightly part the surfaces 41a and 42a whereby the surfaces 89 and 88 serve as abutment surfaces.

It will be noticed that in both embodiments the actual adjustment takes place during brake application. By effecting various modifications it can be arranged that the actual adjustment takes place upon brake release. This is achieved in each embodiment by making the non-reversible and reversible screw thread connections of the same hand and by making the conical friction surfaces 36, 37 or 36a, 37a slope the other way and transposing the spring 40 or 40a to the opposite side of the annulus 31 or 31a.

The adjusting mechanisms 25 and 50 are not damaged if the travel between the pistons 20 and 21 should be greater than the travel permitted between the members of the mechanism. The encapsulating container is simply pulled by the strut 24 partially out of the bore 30. This might happen if the actuator is operated hydraulically with the brake pads removed or if, for some reason new brake pads are replaced by worn brake pads. The encapsulating container is pressed home again by operation of the hand brake.

The adjuster mechanisms 25 and 50 of FIGS. 2 to 5 may be used in so-called swinging caliper disc brakes instead of the opposed piston disc brake of FIG. 1. In this case the piston, in which the adjuster mechanism 25 or 50 is fitted, is slidable in a bore in a body member which comprises two parts of which one part contains said bore and the other part closes the end of this bore and contains a cam equivalent to the cam 22 of FIG. 1. As in FIG. 1 this cam acts through a dolly on a strut which has the non-reversible screw thread connection 35 with the nut 28 or 28a of the mechanism 25 or 50. The strut 24a is sealed to said other part by a sealing ring like the ring 48 of FIG. 1 and is prevented from turning by a plate like the plate 49 which is attached to said other part and which engages in flats or grooves in the strut. The caliper includes the two-part body member and can swing about an axis perpendicular to the disc axis. The axis of swinging may be parallel to or perpendicular to the line of the brake drag forces. The piston acts on the directly operated pad assembly and the caliper which is rigid with respect to the two part body member acts on the indirectly operated pad assembly.

FIG. 6 illustrates an adjuster 66 for a drum brake having shoes (not shown) cooperating with a drum (also not shown). A hydraulic actuator acts on the upper ends of the shoes whose lower ends rest against abutments. An auxiliary mechanical actuator comprises a lever which acts between the upper end of one shoe and a strut assembly 65 acting on the upper end of the other shoe. A brake return spring (not shown) also draws the two upper ends of the shoes and towards one another.

The strut assembly 65 contains the automatic slack adjuster 66. The strut assembly comprises a first part 67 having an external screw thread 26 mating with an internal screw thread 27 in a nut 28b to provide a non-reversible screw thread connection 35. An encapsulating container 68 for the adjusting mechanism is a press fit on one end of the second part 69 of the strut assembly. The nut 28b has an external screw thread 32b which meshes with an internal screw thread 33b in an annulus 31b to form a multi-start reversible screw thread connection 34b of the same hand as the non-reversible screw thread connection 35. The annulus 31b has an external conical friction surface 36b which cooperates with an internal conical friction surface 37b inside the container 68.

The not illustrated brake return spring urges an abutment washer 70 at the right hand end of the nut 28b into abutment with the nut 28b. This serves to prevent the nut 28b from turning under the effects of vibration. Resilient means in the form of a bowed washer spring 40b acts to the right on the annuus 31b to urge the friction surfaces 36b, 37b into engagement with one another and is disposed between the left hand face of the annulus 31b and a ring 72 closing the cavity in the container 66 and retained by a peened in lip 73. A rubber boot 75 prevents dirt getting into the adjuster. A spring 74 acts between an internal shoulder 71 inside the container 68 and the abutment washer 70 and serves to cause the parts 67 and 69 of the strut assembly 65 to follow the respective movements of the brake shoes during brake application by the hydraulic actuator.

In the embodiment of FIG. 6 the normal brake slack is determined solely by the axial clearance at the reversible screw thread connection 34b. The effect of the normal manufacturing clearance at the non-reversible screw-thread connection 35 is eliminated by the bias supplied to the nut 28b by the brake return spring when the brake is not operated or by the additional spring 74 when the brake is operated. During hydraulic actuation, the strut part 67 will move to the left relative to the part 69 under the influence of the spring 74. When there is excess brake slack, the axial clearance at the reversible screw-thread connection 34b is taken up. The frictional torque developed at the friction surfaces 36b, 37b, and at the washer spring 40b is less than that resisting rotation of the nut 28b at the non-reversible screw thread connection 35 and as a result the reversible screw thread connection 34b causes the annulus 31b to be turned slightly on the nut 28b. When the brake is released the two parts 67 and 69 again move towards one another but this time the frictional torque developed at the conical frictional surfaces 36b and 37b is increased to a value higher than that resisting rotation of the nut 28b. The reversible screw thread connection 33b now causes the nut 28b to be turned on the strut part 67 to effect the automatic adjustment.

As in preceding embodiments it can be arranged that the adjustment takes place during brake actuation rather than during brake release by making the screw thread connections 35 and 34b of opposite hand and by arranging the conical friction surfaces 36b and 37b to slope in the other direction, the spring 40b being transposed to the other side of the annulus 31b.

It will be seen that each of the illustrated embodiments of slack adjusting mechanism is compact and contains only a few parts, which parts are comparatively small, especially those provided with the reversible screw thead. Also in each embodiment the adjusting mechanism forms a capsule ready to receive an externally threaded strut member.

The adjuster is thereby readily replaceable in the case of malfunction.

It will be noted that because the adjuster mechanism is a self-contained capsule, a given capsule can be used for struts 24, 65, 67 of different lengths according to the size of actuator to which the adjuster is to be fitted.

Because the screw threads, and in particular the reversible screw thread connection, are of a comparatively large diameter these can be produced by die-casting or by thread rolling. Also, because of this larger diameter, the area transmitting the axial loading is greater so that a comparatively weak material can be used for the annulus 31, 31a, 31b such as zinc or brass rather than steel.

I claim:

1. A slack adjuster for a brake system comprising in combination a first non-rotatable member, a second rotatable nut member and a third non-rotatable member having a common thrust axis, said first and nut members having axially external and internal threads, respectively, forming a non-reversible screw-thread connection between said first and nut members, said nut member being axially displaceable and rotatable relative to said third member, a fourth annular member coaxial with said thrust axis and encircling said nut member; a reversible screw-thread connection between said annular member and one of said nut and third members; cooperating friction surfaces between said annular member and the other of said nut and third members; and resilient means axially biassing said annular member in a direction to urge said friction surfaces towards one another.

2. A slack adjuster according to claim 1 in which said friction surfaces are in engagement with one another under the bias of said resilient means when the brake system is released.

3. A slack adjuster according to claim 1, said nut member having an abutment surface, further comprising a non-rotatable abutment surface complementary thereto and second resilient means biassing said nut member in a direction to urge said abutment surfaces into engagement with one another when the brake system is released in order to increase the frictional torque resisting rotation of said nut member.

4. A slack adjuster according to claim 3 in which said complementary abutment surface is defined on said third member.

5. A slack adjuster according to claim 4 which further comprises frictional abutment surfaces additional to the previously mentioned abutment and friction surfaces, and in which said second resilient means comprises a spring which acts directly on said nut member at said additional abutment surfaces.

6. A slack adjuster according to claim 5 in which said spring acts between said nut and third members.

7. A slack adjuster according to claim 5 which further comprises a cup-shaped abutment element for protecting said reversible screw thread connection from said spring, said spring acts on said nut member through said abutment element.

8. A slack adjuster according to claim 3 in which said second resilient means comprises a brake return spring external to the adjuster.

9. A slack adjuster according to claim 1 in which said third member comprises an encapsulating container within which are disposed said nut member, said annular member and said resilient means.

10. A slack adjuster according to cliam 4 in which said third member comprises an encapsulating container within which are disposed said nut member, said annular member, said first-mentioned resilient means and said additional resilient means.

11. A slack adjuster mechanism for a vehicle brake system comprising a nut member having an internal screw thread adapted to mate with an external screw thread on a strut member to form a non-reversible screw thread connection, an encapuslating container member surrounding said nut member, said nut and container members having cooperating axial abutment surfaces, an annular member disposed within said container member and encircling said nut member, said annular member and one of said nut and container members having a reversible screw thread connection therebetween, said annular member and the other of said nut and container members having cooperating friction surfaces therebetween, and resilient means disposed within said container member and axially biassing said annular member in a direction to urge said friction surfaces towards one another.

12. An adjuster mechanism according to claim 11 which further comprises second resilient means acting axially on said nut member to bias said abutment surfaces against one another.

13. An adjuster mechanism according to claim 12 in which said second resilient means comprises a spring disposed within said container member and acting between said nut and container members.

14. An adjuster mechanism according to claim 13 which further comprises a cup-shaped abutment element for protecting said reversible screw thread connection from the spring, said spring acting on said nut member through said abutment element.

15. A slack adjuster according to claim 1 in which at least one of said friction surfaces is conical.

16. A slack adjuster according to claim 1 in which said annular member has symmetrically oppositely tapering conical surfaces either one of which can serve as said friction surface on said annular member, whereby said annular member may be inserted either of opposite ways round in said third member.

17. A slack adjuster according to claim 1 wherein said reversible screw thread connection is between said annular member and said third member and comprises an external thread on the outer periphery of said annular member and an internal thread inside said third member and wherein said friction surfaces comprise an internal annular surface inside said annular member and an external friction surface around said nut member.

18. A slack adjuster according to claim 1 wherein said reversible screw threw connection is disposed between said annular member and said nut member and comprises an internal thread inside said annular member and an external thread around said nut member and wherein said cooperating friction surfaces comprise an external annular surface around said annular member and an internal annular surface inside said third member.

19. A slack adjuster according to claim 1 in which said resilient means comprises a spring washer bearing against said annular member.

20. A slack adjuster according to claim 3, wherein said reversible screw thread connection is between said annular member and said third member and comprises an external thread on the outer periphery of said annular member and an internal thread inside said third member and wherein said friction surfaces comprise an internal annular surface inside said annular member and an external friction surface around said nut member and which further comprises an abutment element by which said second resilient means acts on said nut member, said first-mentioned resilient means comprising a spring washer acting between said annular member and said abutment element.

21. A slack adjuster according to claim 3 wherein said reversible screw thread connection is disposed between said annular member and said nut member and comprises an internal thread inside said annular member and an external thread around said nut member and wherein said cooperating friction surfaces comprise an external annular surface around said annular member and an internal member surface inside said third member and which further comprises a washer held in place in said third member by said second resilient means, said first-mentioned resilient means comprising a spring washer acting between said annular member and said washer.

22. A slack adjuster according to claim 1 in which said reversible screw thread connection comprises mating multistart threads.

23. A slack adjuster according to claim 1 in which said reversible screw-thread connection has substantial axial clearance, said axial clearance accommodating at least a preponderance of the desired normal brake slack.

* * * * *